REMOTE CONTROL SYSTEM

Filed Nov. 7, 1956

INVENTORS.
Bernard S. Parmet,
James J. Krakora, Jr.,
By Mueller and Aichele
Attys.

REMOTE CONTROL SYSTEM

Filed Nov. 7, 1956

2 Sheets-Sheet 2

INVENTORS.
Bernard S. Parmet,
James J. Krakora, Jr.,
By Mueller and Aichele
Attys.

2,947,812
Patented Aug. 2, 1960

2,947,812

REMOTE CONTROL SYSTEM

Bernard S. Parmet, Elmwood Park, and James J. Krakora, Jr., Chicago, Ill., assignors to Motorola, Inc., Chicago, Ill., a corporation of Illinois Filed Nov. 7, 1956, Ser. No. 620,875
14 Claims. (Cl. 178—7.5)

This invention relates to remote control apparatus and more particularly to wireless remote contol apparatus for operating the channel selector of a television receiver.

Since a viewer of a television receiver generally sits several feet from the receiver screen in order to obtain the most favorable view point for the image, it has been proposed to use remote control apparatus so that one may change channels from a viewing position. It is obviously an advantage to construct such a control system without running wires between the control unit and the receiver and to provide a compact control unit for initiating operation of the channel selector. However, incorporating a radio frequency contolled tuning system into a television receiver presents certain problems.

The power of the wireless control transmitter must be kept low to stay within government regulations on radiation and to prevent unwanted interference with other equipment. This, of course, dictates the use of a very sensitive receiver. It may also be appreciated that there will be considerable energy in the vicinity of the television receiver itself which stems from the broad band video signal utilized by the receiver and the high voltage sawtooth sweep pulses having electrostatic and electromagnetic components at many frequencies. Because of this high level energy in a television receiver it has been found that a sensitive remote control receiver can easily be actuated to cause false operation which would operate the channel selector and tune out a received television station. Furthermore, comparatively minor electrical disturbances or noise may also be picked up by a sensitive remote control receiver to cause false operation which would, of course, render a remote control system impractical.

Thus it may be seen that the receiver of a wireless remote control system for tuning a television receiver must be highly sensitive for proper operation by a low power transmitter, yet the remote receiver should not respond to the relatively high level, stray energy around a television receiver and to random noise or spurious responses commonly occurring in the radio frequency energy spectrum.

Accordingly, it is an object of the present invention to provide a radio frequency controlled remote system for a television receiver which overcomes tendencies for false operation outlined above.

A further object of the invention is to provide a wireless remote control system which may be operated by a small, low power radio frequency transmitter and which is insensitive to spurious energy or noise so that false triggering of the system is greatly reduced.

Another object is to provide a sensitive remote control receiver to be incorporated in a television receiving system, which receiver has adjustments that may be set to reduce response to the relatively powerful video and pulse energy radiated in the television receiving system.

Another object is to provide an improved remote control receiver including an antenna arranged in the cabinet of a television receiving system for responding to the signal from a low power remote control transmitter unit adapted to be held in the hand.

A feature of the invention is the provision of remote control apparatus for a television receiver including a small, self-contained, radio frequency transmitter, a highly sensitive remote control receiver positioned in the cabinet of the television receiver and an antenna also positioned in the cabinet and constructed and oriented to minimize energy pick-up from the circuits of the television receiver.

Another feature is the provision of such remote control apparatus in which the television receiver includes special shielding and the cathode ray tube is electrically grounded in an improved manner so that signal energy in the television receiver and signal energy radiated by body capacity from a person adjacent the television receiver do not cause false operation of the remote control receiver.

Still another feature is the provision of a remotely controlled wireless receiver for operating a tuning motor of a television receiver and including a detector having a variable threshold setting adapted to be adjusted so that beam scanning signals in the television receiver do not operate the remote control receiver.

A still further feature of the invention is the provision of an improved receiver for remote control apparatus including a differential detector to distinguish spurious signals from a desired signal and a narrow band width response to reduce the possibility of false triggering of the remote control receiver.

Another feature is the provision of an improved remote control receiver having a shielded antenna oriented to receive a signal from a low power transistorized transmitter adapted to be hand held and having a directive antenna so that spurious operation is minimized.

Further objects, features and the attending advantages of the invention will be apparent upon consideration of the following description when taken in conjunction with the accompanying drawings, in which.

In brief, the invention provides remote control apparatus particularly adapted for operating the channel selector of a television receiver. The remote transmitter is a small transistorized unit which is self-contained and adapted to be held in one hand of a user. This unit includes a directive antenna to radiate its signals. The television receiver includes a motor for driving the channel selector and this is operated when the signal from the remote transmitter triggers a sensitive remote control receiver. An antenna in the television receiver cabinet, shielded from electrostatic pick-up therein, is used to intercept the remote control signal which is applied to the remote receiver. The receiver includes an "average" signal detector poled to cause operation of the motor and a "peak" signal detector for noise which is oppositely poled for differential action and reduced noise response. A threshold level may also be established for the detector circuit so that magnetic radiation within the television cabinet as caused by the beam sweep system will not operate the remote control receiver. Post detection integration is used to provide a very narrow response band width for further noise immunity in the remote detector.

For additional security against false triggering the high energy video signal lead to the cathode ray picture tube is shielded so that radiation therefrom will not operate the remote apparatus and a special modification of the aquadag ground on the picture tube lessens the possibility of the body capacity of a person near the picture tube causing radiation of energy derived from the tube in a sufficient amount to trigger the sensitive remote receiver.

Figures 1, 3, 4, 5:
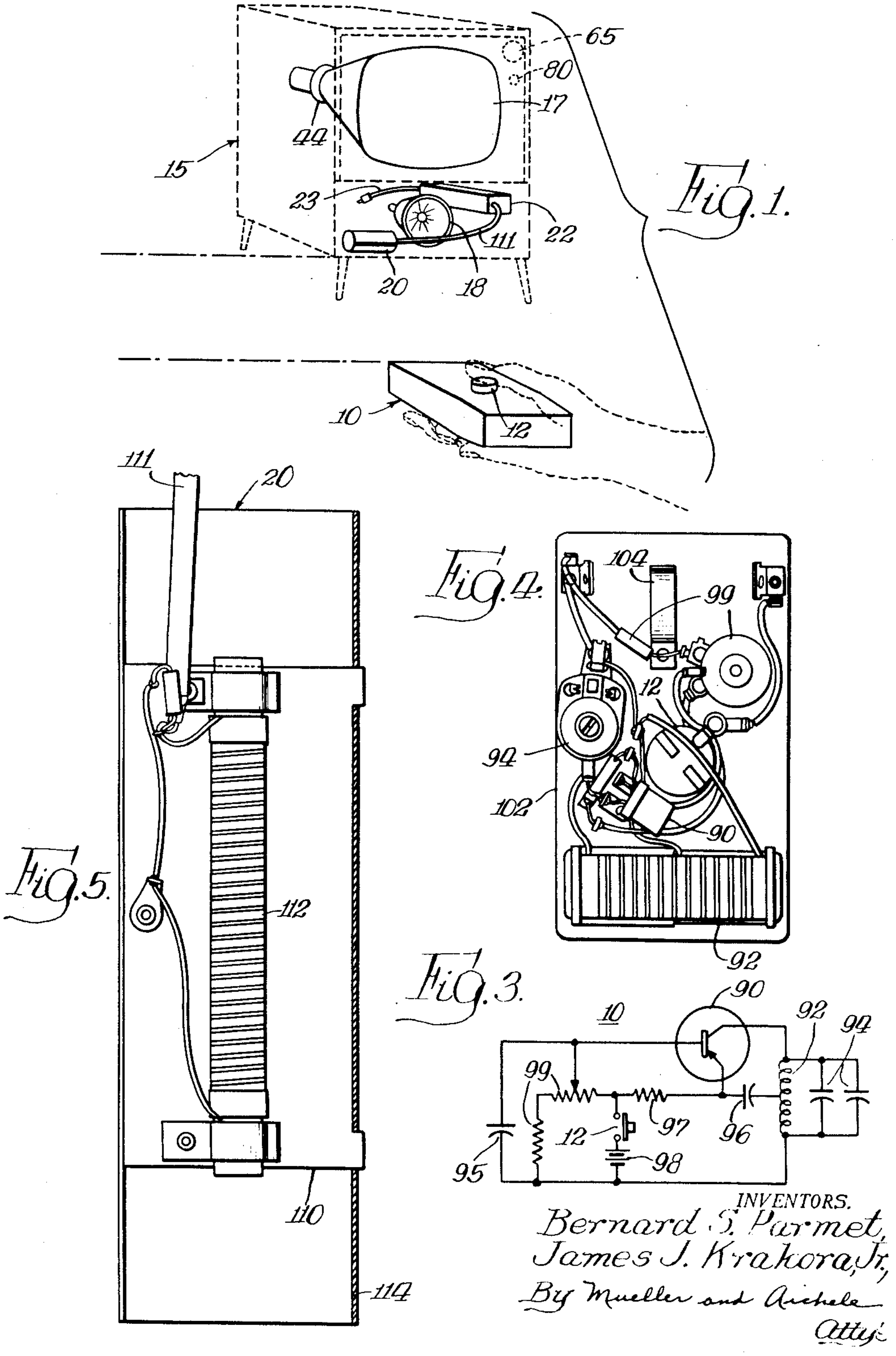
Fig. 1 is a perspective view showing the remote control transmitter and receiver as used with a television receiver.
Fig. 3 is a schematic diagram of the remote control transmitter for the system.
Fig. 4 is a view of the chassis of the remote control transmitter.
Fig. 5 is a sectional view of the antenna of the remote control receiver.

Fig. 1 shows the remote control transmitter 10 as it may be held in the hand of a user for operating push-button 12 to control the tuner or channel selector in television receiver 15. It may be noted that the transmitter 10 is a small unit using self-contained power for greatest convenience. Television receiver 15 includes a cathode ray picture tube 17 and a loudspeaker 18. Within the cabinet of the receiver a remote control antenna 20 is supported in the lower front portion of the cabinet for optimum pick-up of the signal from transmitter 10. Antenna 20 is coupled to the remote control receiver unit 22 which includes an output and power cable 23 which may be coupled to the chassis of the television receiver to control operation of a tuner motor and to derive power for operating the receiver 22.

Figure 2:
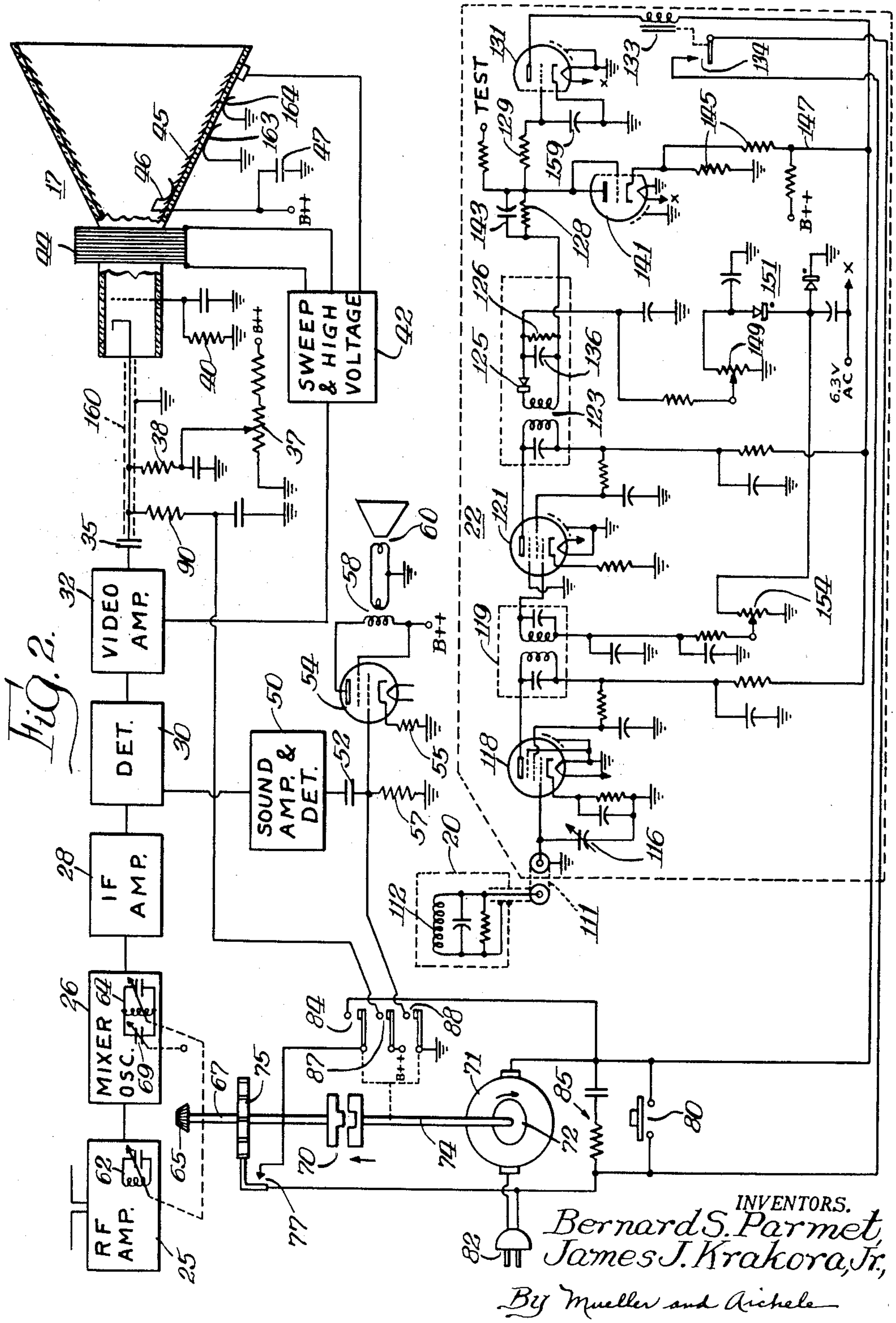
Fig. 2 is a schematic diagram of a television receiver together with the remote control receiver for operating the channel selector of the television receiver.

Fig. 2 shows the remote control receiver 22 in schematic form as it would be used with the television receiver 15. The television receiver shown includes a radio frequency amplifier stage 25, a mixer oscillator circuit 26, an intermediate amplifier 28, a detector 30, and a video amplifier 32, all performing functions well known in the art. The video signal from video amplifier 32 is applied to the cathode of picture tube 17 through capacitor 35. The cathode of tube 17 is maintained at a particular positive potential (bias) established by the setting of brightness control 37 which is incorporated in a voltage divider between B++ and ground. The control 37 is coupled to the cathode through resistor 38. The grid of the picture tube is connected to ground through resistor 40.

Video amplifier 32 is also connected to the sweep and high voltage system 42 which provides deflection signals for energizing deflection yoke 44 and scanning the electron beam in the picture tube 17. System 42 also provides a high voltage potential for the screen of tube 17. An aquadag coating 45 on the inside of the flared portion of the tube forms an intermediate anode in this tube and is maintained at the B++ potential through connector 46. Capacitor 47 bypasses this potential source to ground at signal frequencies.

Detector 30 is also coupled to the sound amplifier and detector 50 which will demodulate the sound intercarrier supplied by detector 30 and produce an audio frequency signal. This signal is applied through blocking capacitor 52 to the control grid of vacuum tube 54 which comprises the audio frequency power amplifier. Cathode bias for the tube 54 is furnished by resistor 55 and a D.C. return to ground for the control grid thereof is provided by resistor 57. The output of tube 54 is coupled through output transformer 58 to the loudspeaker 60. RF amplifier 25 includes at least one tuned circuit 62 which is ganged to a tune circuit 64 in the mixer oscillator 26. These may be controlled manually by means of knob 65 fastened to control shaft 67. A fine tuner 69 for the local oscillator signal is shown as a variable capacitor to alter slightly the resonant frequency of tuned circuit 64. The channel selecting apparatus of the receiver including tuned circuit 62 and 64 may be of a type known in the art and it is contemplated that this selector be of the detenting type.

Shaft 67 is extended and coupled to a portion of clutch 70 which closes whenever selecting motor 71 is energized. This structure may be provided by a declutching rotor 72 connected to clutch 70 by shaft 74. Shaft 67 carries a cam indexing disc 75 having projections therefrom corresponding to each of the television channels tunable by the resonant circuits 62, 64. A switch 77 is mounted adjacent disc 75 and a projecting cam on disc 75 engages switch 77 to open the same when a desired channel has been selected.

Motor 71 may be energized by operating channel selecting switch 80 which is conveniently positioned on the television cabinet (Fig. 1). Closing switch 80 supplies power from line plug 82 directly across the motor thereby closing clutch 70 and driving the channel selecting apparatus. Once the motor has started switch 80 may be opened (released) in which case the energizing power is provided through switches 77 and 84. Switch 84 together with switches 87 and 88 are mechanically coupled to shaft 74 to be closed when clutch 70 is closed. A series RC network 85 is coupled across switches 77 and 84 to reduce sparking. Accordingly, motor 71 will continue to run and drive the tuning apparatus until a cam on disc 75 engages switch 77 to open the same on a desired channel.

During the channel selecting operation switch 87 applies B++ through resistor 90 to the cathode of picture tube 17 to cut off this tube and darken the screen. Switch 88 at the same time grounds the control grid of tube 54 in the audio system to effectively silence the receiver loudspeaker 60. It is also possible to energize motor 71 by completing a circuit across switch 80 through operation of the remote control transmitter 10 as will now be described.

As shown in Fig. 3 transmitter 10 includes a transistor 90 and various circuit elements forming a radio frequency oscillator which may be energized by operating push-button switch 12. In a constructed embodiment of the remote control apparatus the transmitter 10 was made operative on a frequency of 2.82 megacycles established by the antenna coil 92 and capacitor 94. Tuned circuit 92, 94 is coupled to the collector of transistor 90 and through blocking capacitor 95 to the base thereof. A feedback tap on antenna coil 92 is coupled through capacitor 96 to the emitter and a bias is developed for the emitter by resistor 97 which is connected through switch 12 to the positive terminal of battery 98. A voltage divider 99 is connected across the battery 98 (through switch 12) and a tap point of this divider is connected to the base of the transistor for bias. Adjustment of this tap point will adjust the power output of the transmitter which should be kept low to minimize interference with other electronic equipment and remain within government regulation on power output for remote control devices of this type.

Fig. 4 shows the chassis panel 102 on which the components of transmitter 10 may be mounted and it may be noted that antenna coil 92, which is made directional to reduce undesired radiation, is supported on the edge of this panel in the middle of which switch 12 is disposed. At the opposite end of the panel, the end which should preferably be held in the hand of the user, a clip 104 is provided to retain battery 98 which is not shown in this view. It may be seen that the transmitter is constructed in compact form as a self-contained unit which is convenient for one hand operation by merely pointing the end of the device containing antenna coil 92 toward antenna 20 in the elevision receiver 15 (Fig. 1) and operating switch 12 by means of the thumb.

A sectional view of antenna 20 (used for the remote receiver) is shown in Fig. 5. This unit includes a panel 110 which supports antenna 112 connected to a cable 111 which is coupled to the remote control receiver 22. The antenna coil and its supporting panel are disposed in a metalic cylindrical shield 114 which is longer than panel 110 and of a sufficient diameter so as not to unduly reduce the Q of the antenna coil 112. Shield 114 preferably includes an open seam so it forms an incomplete loop surrounding the antenna coil to reduce eddy current losses therein.

Reference will now be made to Fig. 2 for a description of the circuit of remote control receiver 22. It can be seen that antenna coil 112 is coupled across capacitor 116 which is used to align the input circuit to the receiver so that it is tuned to the frequency of transmitter 10. Receiver 22 also includse a first RF amplifier 118 which is coupled by means of tuned transformer 119 to a second RF amplifier 121. The output of RF amplifier 121 is coupled through transformer 123 to the series connection of diode 125 and diode load resistor 126. The cathode side of load resistor 126 is connected through resistors 128 and 129 to the control grid of relay tube 131. Sufficient conduction of tube 131 energizes relay 133 to close contacts 134 which are connected across switch 80 for operating channel selector motor 71.

Diode 125 and its associated load resistor 126, which is shunted by capacitor 136, are arranged to provide a signal of positive polarity with respect to ground which follows the average level of a signal applied to the detector. Transformer 123 is also coupled through resistor 128 to triode vacuum tube 141, coupled as a diode, which detects signals of pulse like form (noise and the like) and applies them to the control grid of tube 131 as a negative voltage opposing the voltage detected by diode 125. Capacitor 143 is connected across resistor 128 which thus forms the load or voltage developing network for the "peak" detector (tube 141). A voltage divider 145 is connected between ground and lead 147 which provides a positive potential for operating the remote receiver from B++ of the television receiver. A point in voltage divider 145 is connected to the cathode of tube 141 for slightly biasing this element of the tube. Accordingly, it may be seen that a desired signal will be detected to produce a positive potential and cause increased conduction of tube 131 and operation of tuning motor 71. However, spurious noise pulses will be detected by the peak detector, including tube 141, and applied as a negative potential to tube 131 so that these signals do not cause false operation of the remote control system.

It is contemplated that receiver 22 be very sensitive in order to operate in response to the relatively weak signal from transmitter 10, the gain being of the order of 40,000 times up to the detector stages, which means that electromagnetic radiation from portions of the television receiving circuit, including deflection yoke 44, could cause the remote receiver to operate and relay 133 to remain closed. For overcoming this difficulty a negative threshold potential is applied from the arm of potentiometer 149 to the anode of diode 125. This potential is developed by a voltage doubler system 151 which is energized by the 6.3 volt A.C. potential utilized for the filaments of the tubes in the receiver. This will make available a potential up to negative 15 volts which can be applied to resistors 126, 128 and 129 to the control grid of tube 131 to establish a bias which the remote control signal must overcome before relay 133 will be operated. A portion of the threshold potential from voltage doubler 151 is also applied to a potentiometer 154 which includes an arm connected to the control grid of RF amplifier tube 121 for setting the sensitivity of this tube.

As a further precaution against false operation due to spurious signals and noise in the radio frequency spectrum, a post detection integration network including resistor 129 and capacitor 159 are connected between the peak and average detectors and the control grid of relay tube 131. The RC time of 129, 159 is chosen to provide a narrow band width of the order of 7 cycles per second. This, of course, further reduces the possibility of tuning the television receiver off a particular channel when noise signals are present. If the band width of this integration network were reduced much below 7 c.p.s. to further increase the noise rejection, it is possible that relay 133 would release so slowly that a desired channel would be passed before contacts 134 could open.

From the foregoing it may be seen that energization of transmitter 10 will close contacts 134 to energize motor 71 and drive the tuning circuit 62, 64. Deenergizing the transmitter will open contacts 134 and motor 71 will continue to operate until a cam of disc 75 engages switch 77 to open the same and stop the motor on a desired channel. It may be appreciated that contacts 84 are provided in the motor energizing circuit so that the motor will not operate when manual knob 65 is turned, in which case the switch 77 may be closed when a cam of disc 75 is not engaging this switch.

In installing the remote control receiver 22 and antenna 20 in the television receiver 15 (Fig. 1) the orientation of antenna 20 may be altered slightly to minimize the pick-up from the television receiver itself, including yoke 44, and then potentiometer 49 may be adjusted to establish the maximum receiver sensitivity permissible without energization by this stray energy within the television receiver caused mainly by the horizontal sweep signal, generally at 15.75 kilocycles. However, it has further been found that in some instances, particularly when adjusting fine tuner 69 (Fig. 2) the video signal may be radiated to produce sufficient energy at the remote control signal frequency to cause operation of the receiver 22 and false response thereof. Accordingly, a shielded lead 160 is used in applying the high level video signal to the television picture tube 17.

It has further been found, in a practical construction of the invention, that the picture tube itself may have available at its screen a sufficient amount of energy at the sawtooth scanning frequency so that body capacity from a person standing near the screen would couple this energy into antenna 20 and cause false response of the remote control system. To overcome this difficulty grounding strips 163, 164 are placed in contact with the outer surface of the flare of picture tube 17 to provide increased capacity between the aquadag coating 45, or intermediate anode of tube 17, and ground, thereby reducing the amount of energy available at the screen of the tube to be influenced by the body capacity of a person around the picture tube.

Therefore from the foregoing it may be understood that the present invention provides a highly sensitive remote control receiver which may be mounted within the cabinet of a television receiver wherein there is a great amount of radio frequency energy which could cause false operation of the receiver. However, according to the present invention a remote control receiver may be made highly sensitive and responsive to a low power transmitter signal and yet remain relatively unresponsive to noise pulses, video frequency energy in the television receiver, and radiated energy from the sawtooth sweep signals within the receiver. Furthermore, the remote control system includes adjustable provisions for minimizing response to the spurious signals in a given receiver in order to minimize false triggering and maximize the sensitivity to the desired transmitter signal. It may be noted that the remote control system thus described is of a relatively compact form so that it may be positioned in the extra spaced provided in a television cabinet without enlarging the same and that the only control necessary, and utilized apart from the television receiver cabinet, is a small hand held transmitter unit which is entirely self-contained.

What is claimed is:

1. In a television receiving system having tunable signal translating means, remote control apparatus responsive to a radiated control signal of particular frequency including in combination, an electric motor for operating the signal translating means, an energization circuit for said motor, a high gain tuned amplifier for the control signal, a signal interceptor for receiving the radiated control signal and applying the same to said amplifier, detector means coupled to said amplifier and comprising first and second diode means with resistor-capacitor means connected thereto to provide outputs of opposite polarities from said detector means, one diode means providing an output signal in response to the signal translated by said amplifier, relay means having contacts connected to said energization circuit of said motor for selectively completing said circuit, an operating circuit for said relay means, including an electron valve and a resistor-capacitor network forming an integrating circuit and coupled between said one diode means and said electron valve for applying said output signal to said electron valve with a polarity to cause conduction thereof in response to the output signal, said operating circuit causing operation of said relay to energize said motor in response to conduction of said valve, said integrating circuit having a bandwidth of the order of seven cycles per second.

2. Remote control apparatus responsive to a radiated control signal of particular frequency, including in combination, an amplifier with a plurality of amplifier stages with circuit means tuned to the particular frequency and providing high gain at such frequency, signal interceptor means for receiving the radiated control signal applying a corresponding electrical signal to said amplifier, detector means coupled to said amplifier and comprising first and second diode means with resistor-capacitor means connected thereto to provide respective outputs of opposite polarities, one diode means providing an output signal in response to the electrical signal translated by said amplifier, relay means having contacts for performing a control function, electron discharge means for operating said relay means, and a resistor-capacitor network forming an intergrating circuit and coupled between said one diode means and said electron discharge means for applying said output signal to said electron discharge means with a polarity to cause conduction thereof in response to the output signal, the constants of said integrating circuit being chosen so that the control signal must be of greater than a predetermined minimum duration for actuation of said relay means in response thereto and biasing circuit means including rectifier and filter means coupled to said electron discharge means to bias the same and establish the level of said output signal required for operation of said relay means, said biasing circuit means further including a circuit coupled to said amplifier to provide a variable bias therefor and establish the sensitivity thereof to said control signal.

3. Remote control apparatus responsive to a radiated control signal of particular frequency, including in combination, a high gain tuned amplifier for the control signal, a signal interceptor for receiving the radiated control signal and applying the same to said amplifier, detector means coupled to said amplifier and comprising first and second diode means with resistor-capacitor means connected thereto to provide outputs of opposite polarities from said detector means, one diode means providing an output signal in response to the signal translated by said amplifier, relay means having contacts for controlling a utilization circuit, means including an electron valve for operating said relay means, resistor-capacitor means forming an integrating circuit and coupled between said one diode means and said electron valve for applying said output signal to said electron valve with a polarity to cause condition thereof in response to the output signal, the constants of said integrating circuit being chosen so that the bandwidth thereof is of the order of seven cycles per second, and voltage supply means providing a bias for said electron valve to set the level of the output signal at which said relay means is operated.

4. In a television receiving system having housing means therefor, tunable signal translating means coupled to a picture tube, and a sweep system for scanning an electron beam in the picture tube remote control apparatus responsive to a radio frequency control signal, including in combination an electric motor and mechanical coupling means operated thereby to drive and tune the signal translating means, and antenna disposed in the housing means for receiving the control signal, said antenna being adjustably positioned in the housing means to be oriented to reduced pick-up of energy from the sweep system, a receiver circuit coupled to said antenna and disposed in the housing means, said receiver circuit including detector means responsive to the radio control signal and first circuit means operated thereby for energizing said motor, said first circuit means including an integration network providing energization of said motor with a control signal of certain duration, and second circuit means including threshold bias means to establish a level of detected signals at which said motor is operated, said threshold bias means being adjustable to compensate for energy pick-up from the sweep system by said antenna, whereby reception of the radio frequency control signal provides remote adjustment of the television receiving system.

5. In a television receiving system having housing means therefor and tunable signal translating means coupled to a picture tube: remote control apparatus responsive to a control signal of given frequency, including in combination, an electric motor and mechanical coupling means operated thereby to drive the tunable signal translating means, receiving means for said control signal including a control signal interceptor disposed in the housing means of the television receiving system and a control signal receiver including high gain tuned amplifier means and polarized relay means adapted to be operated to energize said electric motor, said control signal receiver also including detector means coupled to said amplifier means and said relay means for producing a potential of first polarity to operate said relay means in response to reception of said control signal of given frequency, said detector means also including means for rectifying a further signal at other than the given frequency and poled to produce a potential of second polarity opposite to that of said potential of first polarity to bias said polarized relay means thereby tending to prevent operation of said relay means so that reception of said control signal of given frequency causes tuning of the signal translating means and relay means is relatively unresponsive to spurious signals and a further bias circuit coupled to said tuned amplifier means and providing a variable bias potential to regulate the sensitivity thereof.

6. In television receiving system having housing means therefor and tunable signal translating means coupled to a picture tube: remote control apparatus responsive to a radio control signal, including in combination an electric motor and mechanical coupling means operated thereby to drive the tunable signal translating means to a desired channel, an antenna disposed in the housing means of the television receiving system, a control signal receiver including high gain radio frequency amplifier means coupled to said antenna, said control signal receiver including relay means adapted to be operated to energize said electric motor and detector means coupled to said amplifier means and in an energization circuit for said relay means for operating said relay means in response to a potential of given polarity, said detector means including means for producing a potential of said given polarity in response to the average level of signals from said antenna including said control signal and means for producing a potential of opposite polarity according to the peak level of signals from said antenna, and said detector means further including an integrating resistor-capacitor network for applying to said relay means only detected signals within a narrow bandwidth, so that reception of said radio control signal causes tuning of the signal translating means and said control signal receiver is relatively insensitive to signals other than said radio control signal.

7. In a television receiving system having housing means to enclose the system, tunable signal translating means coupled to a picture tube with an aquadag coating, and a sweep system for scanning a beam in the tube: remote control apparatus responsive to a radio frequency control signal, including in combination an electric motor and mechanical coupling means operated thereby to adjust the receiving system to a desired channel, receiving antenna means disposed in the housing means of the receiving system for intercepting said control signal, a control signal receiver coupled to said receiving antenna means and responsive to said control signal to energize said electric motor, said control signal receiver including high gain amplifying means and detector means responsive to said control signal and differentially responsive to noise signals, circuit means controlled by a detected control signal including polar responsive switch means and energization means to operate said electric motor, means for shielding the intercoupling of the signal translating means and the picture for confining video energy translated to the picture tube and preventing pick-up thereof by said receiving antenna means, and means for bypassing alternating current energy from the aquadag coating of the picture tube so that objects in proximity to the picture tube do not couple energy from the sweep system to said receiving antenna means, so that said control signal receiver is relatively insensitive to reception of spurious radio frequency energy and remote tuning of the television receiving system is provided by reception of the radio frequency control signal.

8. In a television receiving system having housing means to enclose the system, tunable signal translating means coupled to a picture tube, and a sweep system for scanning a beam in the tube: remote control apparatus responsive to a control signal, including in combination an electric motor and mechanical coupling means operated thereby to tune the signal translating means to a desired channel, receiving antenna means disposed in the housing means of the receiving system for intercepting said control signal, said receiving antenna means including a tubular shield formed into an incomplete loop to reduce eddy current losses therein and to minimize reception of electrostatic energy from the sweep system, a control signal receiver coupled to said receiving antenna means and disposed in the housing means, said control signal receiver including high gain radio frequency amplifying means coupled to differential detector means adapted to produce a control potential in response to reception of said control signal, circuit means responsive to said control potential for energizing said electric motor, a bias potential source, means applying a potential from said source to said detector means to establish a level of signals in said control signal receiver at which said circuit means responds, said bias potential source being adjustable to compensate for energy received by said receiving antenna means from the sweep system of the television receiving system, whereby said control receiver is relatively insensitive to undesired radio frequency energy applied thereto and reception of said control signal causes said control signal receiver to respond and operate said electric motor for tuning the television receiving system.

9. In a television receiving system having housing means to enclose the system, tunable signal translating means coupled to a picture tube with a coated anode electrode for accelerating a beam, and a sweep system for scanning the beam: remote control appartus responsive to a control signal including in combination an electric motor and mechanical coupling means operated thereby to adjust the receiving system to a desired channel, receiving means for said control signal including antenna means disposed in the housing means of the receiving system and having a shield comprising a partial loop to minimize eddy current losses therein and reduce pick-up of electrostatic energy from the sweep system, said antenna means being oriented to reduce electro-magnetic pick-up from the sweep system, a control signal receiver coupled to said antenna means and disposed in the housing means, said control signal receiver including detector means responsive to the average level of energy received by said antenna means including said control signal to produce a first potential of one polarity and further responsive to the peak level of energy received by said antenna means to produce a second potential of opposite polarity, circuit means responsive to a predetermined relation of said first potential with respect to said second potential for energizing said motor, said circuit means including integrating means providing a narrow band width for excluding undesired energy received by said antenna means, said circuit means further including variable threshold bias means to establish a value of said first potential at which said circuit means is responsive, said threshold bias means being adjustable to compensate for electro-magnetic pick-up from the sweep system by said antenna means, means for shielding the intercoupling of the signal translating means and the picture tube to shield energy therefrom said control signal receiver, and means for bypassing alternating current energy from the anode electrode of the picture tube so that objects in proximity to the picture tube do not couple energy from the sweep system operating on the electron beam in the tube to said antenna means, whereby said control signal receiver is relatively insensitive to reception of undesired energy and reception of the control signal provides remote adjustment of the television receiving system.

10. Remote control apparatus including in combination a low power transmitter self-contained in a unit adapted to be held in the hand, said transmitter having a transistor oscillator circuit with an energization battery therefore, and means for radiating a control signal said transmitter further having an operating switch to operate the same for producing the control signal, receiving means for said control signal including an antenna and detector means responsive to the average level of energy received by said antenna including said control signal to produce a first potential of one polarity, said detector means being further responsive to the peak level of energy received by said antenna to produce a second potential of opposite polarity, circuit means responsive to a predetermined relation of said first potential with respect to said second potential for effecting a desired control, said circuit means including integrating means providing a narrow band width for excluding undesired energy received by said antenna applied to said detector means, and bias means to establish a value of said first potential at which said circuit means is responsive, said bias means being adjustable to compensate for the level of spurious energy pick-up by said antenna.

11. Remote control apparatus responsive to a radio frequency control signal including in combination an electric motor and mechanical coupling means operated thereby to perform a control function, antenna means for intercepting said control signal, a control signal receiver coupled to said antenna means and responsive to said control signal to energize said electric motor, said control signal receiver including high gain tuned radio frequency amplifying means and detector means, said detector means including a portion responsive to the average level of signals received by said antenna means to produce a first control potential and a portion responsive to the peak level of signals received by said antenna means to produce a second control potential, polar responsive switch means for energizing said electric motor, narrow band path circuit means coupling said polar switch means to said detector means for applying said first and second control potentials to said switch means in differential relation with said first potential poled to cause operation of said switch means, and potential supply means coupled to said detector means for establishing a bias level at which said first potential causes operation of said polar responsive switch means, whereby energization of said radio frequency transmitter may control said electric motor and said control signal receiver is relatively insensitive to reception of spurious radio frequency energy.

12. Remote control apparatus including in combination a low power transmitter self-contained in a unit adapted to be held in the hand, said transmitter having a transistor oscillator circuit with an energization battery therefore, and means for radiating a control signal, said transmitter further having an operating switch to operate the same for producing the control signal, receiving means for said control signal including a signal interceptor and tuned amplifier means and detector means, said detector means being responsive to the energy received by said signal interceptor including said control signal to produce a first potential of one polarity, said detector means being further responsive to the energy received by said signal interceptor to produce a second potential of opposite polarity, polar responsive circuit means operative by a predetermined relation of said first potential with respect to said second potential for effecting a desired control, said circuit means including integrating means providing a narrow band width for excluding undesired energy received by said signal interceptor and applied to said detector means, and bias means to establish a value of said first potential at which said circuit means is responsive to compensate for the level of spurious energy pick-up by said signal interceptor, said bias means including a circuit coupled to said tuned amplifier means and providing a variable bias thereto for regulating the sensitivity thereof to the received energy.

13. Remote control apparatus responsive to a radiated control signal of particular frequency, including in combination, an amplifier with a plurality of amplifier stages with circuit means tuned to the particular frequency and providing high gain at such frequency, said amplifier stages including respective electron valves having respective control electrodes therein, signal interceptor means for receiving the radiated control signal and applying a corresponding electrical signal to said amplifier, detector means coupled to said amplifier and comprising first and second diode means with resistor-capacitor means connected thereto to provide respective outputs of opposite polarities, one diode means providing an output signal in response to the electrical signal translated by said amplifier, relay means having contacts for performing a control function, electron discharge means for operating said relay means, a resistor-capacitor network forming an integrating circuit and coupled between said one diode means and said electron discharge means for applying said output signal to said electron discharge means with a polarity to cause conduction thereof and operation of said relay means in response to the output signal, the constants of said integrating circuit being chosen so that the control signal must be of greater than a predetermined minimum duration for actuation of said relay means in response thereto, and a direct current bias network coupled between said resistor-capacitor means and at least one of said control electrodes to establish the gain level of at least one of said electron valves and of said electron discharge means.

14. Remote control apparatus responsive to a radiated control signal of particular frequency, including in combination, an amplifier with a plurality of amplifier stages with circuit means tuned to the particular frequency and providing high gain at such frequency, one of said amplifier stages including an electron valve having a control electrode therein, signal interceptor means for receiving the radiated control signal and applying a corresponding electrical signal to said amplifier, detector means coupled to said amplifier and comprising diode means with resistor-capacitor means connected thereto to provide an output signal of positive polarity in response to the electrical signal translated by said amplifier, relay means having contacts for performing a control function, electron discharge means for operating said relay means, a resistor-capacitor network forming an integrating circuit and coupled between said diode means and said electron discharge means for applying said output signal to said electron discharge means with the positive polarity to cause conduction thereof in response to the output signal, the constants of said integrating circuit being chosen so that the bandwidth thereof is of the order of seven cycles per second whereby the control signal must be of greater than a predetermined minimum duration for actuation of said relay means in response thereto, and a gain control bias network including further diode means coupled to said resistor-capacitor means and said control electrode to establish the respective gain levels of said electron valve and said electron discharge means.

References Cited in the file of this patent

UNITED STATES PATENTS 1,930,029 Alden ---------------- Oct. 10, 1933

OTHER REFERENCES

Radio-Electronics Remote Controls for T.V., page 34, September 1956.

Rider's Television Manual, Zenith 19Z22Q Chassis, page 19–22, vol. 19, copyright 1956.

Rider's Television Manual, Crosley Bulletin No. 512, page 20–26, vol. 20, October 1956.